United States Patent [19]

Henderson

[11] Patent Number: 5,597,596

[45] Date of Patent: Jan. 28, 1997

[54] METHOD OF COLORING CRYSTALLINE MATERIAL

[76] Inventor: Pamela D. Henderson, 4420 St. Peter St., New Orleans, La. 70119

[21] Appl. No.: 565,744

[22] Filed: Nov. 30, 1995

[51] Int. Cl.$^6$ .................. A23L 1/00; H05B 6/00
[52] U.S. Cl. .............. 426/242; 426/250; 426/262; 426/305
[58] Field of Search .................. 426/241, 242, 426/250, 262, 305

[56] References Cited

U.S. PATENT DOCUMENTS 3,269,845  8/1966  Pomeroy .................. 426/250
5,002,789  3/1991  Graf et al. ................ 426/262

*Primary Examiner*—George Yeung
*Attorney, Agent, or Firm*—Keaty & Keaty

[57] ABSTRACT

The invention relates to a method of coloring a crystalline material, such as sodium chloride, and a product resulting therefrom. The method provides for a step of exposing a mixture of crystalline product and liquid coloring agent to microwave energy for a time sufficient to cause drying of the mixture. When mixed with table salt and other crystallized materials, a liquid food dye containing propylene glycol can be used in the concentration of between 0.1 and 2% by total weight.

17 Claims, No Drawings

METHOD OF COLORING CRYSTALLINE MATERIAL

BACKGROUND OF THE INVENTION

This invention relates to a method of processing crystalline material, for example salt, so as to change the color of the conventionally white substance.

In recent years, many dieticians and physicians began to suggest that excessive sodium intake is not beneficial for patients suffering from high blood pressure. As a result, many patients are advised to follow a restricted diet with control over the salt intake during meals. Following this suggestion, many food manufacturers are required to indicate on the product nutrition label the sodium content of the food so as to make it easier for the consumers to regulate their salt intake. However, when people consume non-packaged food, it becomes extremely difficult to determine with any degree of particularity how much salt is being introduced into the food, or added to the food at the table from a salt shaker. This problem is particularly acute for people with poor eyesight because when they add salt to their food directly at the table, and the color of the dish is not much distinguishable from the color of table salt, the users can easily exceed the amount of salt they wish to add to their meal.

Various solutions have been offered to facilitate recognition of white salt crystals when dispensed at the table. One of the solutions is disclosed in U.S. Pat. No. 3,269,845 which suggests a method of making colored table salt with the help of edible coloring. However, this method suggests to avoid drying of a mass of salt crystals because the drying process, in accordance with the '845 patent, can cause crystals to adhere to each other and form undesirable clumps. As a corrective step, the '845 patent suggests to grind and pulverize colored salt. This step will inevitably increase the cost of the finished product.

The present invention contemplates elimination of drawbacks associated with the prior art and provision of a method of coloring crystalline material in a safe and inexpensive manner.

SUMMARY OF THE INVENTION

It is, therefore, an object of the present invention to provide a method of coloring crystalline material in a simple and inexpensive manner.

It is another object of the present invention to provide a process of coloring crystalline material, such as sodium chloride, utilizing readily available substances and tools.

These and other objects of the present invention are achieved through a provision of a method of coloring a crystalline material, for example sodium chloride, which comprises the steps of mixing the crystalline material with a liquid coloring agent, agitiating the mixture to cause a substantially uniform distribution of the liquid coloring agent in the mass of the crystalline material and exposing the resultant mixture to microwave energy for a time sufficient to cause drying of the mixture.

The coloring agent, for example a liquid food dye, is added to sodium chloride in the concentration of between approximately 0.1 and 2% by total weight. Such concentration can result in the addition of between 0.5 and 7.5 ml of a liquid food coloring; agent per 454 g of sodium chloride.

The invention further contemplates provision of a food product which contains a core of crystalline substance and a coating of a food coloring agent deposited on the crystalline substance by exposing the mixture of the crystalline substance and the liquid food coloring agent to microwave energy for a time sufficient to cause drying of the mixture.

DETAILED DESCRIPTION OF THE PREFERRED EMBODIMENT

The present invention is described below as individual steps involved for convenience sake. However, it is to be understood that the present invention can be contributed to a combined action of a series of steps. In accordance with this invention, crystalline material, such as sodium chloride, is deposited into a microwave-safe container. The mixture of sodium chloride and liquid food coloring agent, or dye, comprises between approximately 0.1 and 2% by total weight of the liquid food dye, or coloring agent. The coloring agent can be a water-based food dye containing propylene glycol. A food coloring of a desired shade is gradually added into the container, while the mixture is being agitated. The amount of food coloring will depend on the desired shade of color in the finished product.

During the experiments, it was determined that a food coloring agent, such as for example, one readily available on the market and manufactured by McCormick & Co. of Hunt Valley, Mont., can be used with common salt, that is table salt in addition to rock salt and other various types of salt. This coloring, according to the manufacturer, contains water, propylene glycol, various coloring agents, propylparaben as a preservative and sulfating agent.

The amount of food coloring added differs from approximately 0.5 ml to about 7.5 ml. per 454 g of table salt. The more coloring agent added, the more vibrant the color of the finished product.

The next step of this invention involves positioning of the salt mixed with a food coloring agent in the path of microwave energy and exposing the mixture to the microwave energy for a sufficient time to cause drying of the mixture. The time of exposure to the microwave energy differs from 5 seconds to 1 minute. The microwave energy can have a power of approximately 700 watts and higher, depending on the type of microwave oven available. It is envisioned that as the power of the microwave energy increases, less drying time may be necessary.

A number of examples are described below for illustrative purposes only. It is to be understood that the present invention is not limited to the ratio of ingredients and length of exposure to microwave energy given in the examples.

EXAMPLE 1

454 g of salt were deposited into a microwave-safe container. 10 drops or 0.5 ml of liquid food coloring were added to the container, and the mixture was thoroughly agitated to cause distribution of the food coloring throughout the crystals of sodium chloride. The container with the mixture deposited therein was then placed in a microwave oven having 700 watts of power and operating at 120 volts. The application of microwave energy continued for approximately 5 seconds, or until such time as the mixture became substantially dry. The container was then removed from the path of microwave energy.

The color of the sodium chloride crystals was uniform and visible on a relatively light food items.

EXAMPLE 2

454 g of salt were deposited into a microwave-safe container. 75 drops or 3.7 ml of a liquid food coloring agent were added to the container, and the mixture was thoroughly agitated to cause distribution of the food coloring throughout the crystals of sodium chloride. The container with the mixture deposited therein was then placed in a microwave oven having 700 watts of power and operating at 120 volts. The application of microwave energy continued for approximately 30 seconds, or until such time as the mixture became substantially dry. The container was then removed from the path of microwave energy.

The color achieved with this ratio of the food coloring agent and sodium chloride crystals was more vibrant than the color of sodium chloride in Example 1. The coloring was uniform throughout the mixture, and allowed good visibility on food items of darker shades.

EXAMPLE 3

454 g of salt were deposited into a microwave-safe container. 150 drops or 7.4 ml of liquid food coloring were added to the container, and the mixture was thoroughly agitated to cause distribution of the food coloring throughout the crystals of sodium chloride. The container with the mixture deposited therein was then placed in a microwave oven having 700 watts of power and operating at 120 volts. The application of microwave energy continued for approximately 1 minute, or until such time as the mixture became substantially dry. The container was then removed from the path of microwave energy.

The color of the sodium chloride crystals was very deep, vibrant and of uniform tint. The colored salt was highly visible even on darker foods and did not "run" when added to slightly moist foods.

The experiments demonstrated that the table salt and other crystallized materials processed in accordance with the above method can be colored in any desired shade, for example, red, yellow, orange, blue, green or a combination thereof. It is envisioned that red dye would be particularly beneficial for coloring salt to be used with pasta, potatoes, white meat products, and fried foods. The red coloring becomes highly visible on the light foods to allow easy determination of the amount of sodium chloride dispensed. The use of yellow or orange dye will allow table salt to resemble globules of butter in color, and can be particularly beneficial for use with vegetables, popcorn, white meat products, potatoes or pasta. The use of blue or green dye can be used for darker colored foods, particularly of contrasting shades, since the salt prepared in accordance with the present invention does not readily change color when mixed with even slightly moist foods.

Of course, the ratio of a food coloring agent can be increased to exceed those in the above examples, and it is envisioned that longer drying time will become necessary as the crystals of salt become more saturated. It is possible that excessive amounts of a food coloring agent may cause clumping and would require further grinding or pulverization of the dried mixture. It is also possible that less than 0.5 ml of food coloring per 454 g of table salt would not be as effective in coloring the salt and will demonstrate a less desirable result. Of course a different coloring agent can be used, if desired.

It is also envisioned that microwave energy having greater power will decrease the, time of the drying process, while lower-powered microwave ovens will slow down the drying. It is also possible to use a very small amount of the liquid dye with the salt and use an agitating process only, allowing the mixture to dry under room temperature. However, the provision of the step of drying the mixture with the use of microwave energy ensures a more vibrant, uniform color while not adversely affecting the quality of the resultant product.

It is not clear at this time the precise reasons of the effect which microwave energy produces on the salt crystals. It is possible that the food coloring agent adheres to the surfaces of the crystals and fills in spaces between the crystal surfaces which results in a uniformly colored product. It is possible that microwave energy thoroughly dries the product, and the colors do not run even when mixed with a relatively moist food item.

A similar process, with obvious modifications, can be utilized to produce a colored coarse salt, rock salt and other types of crystallized materials so as to add visibility to an otherwise substantially white substance. The colored granulated material can be used as a table salt, or in commercially prepared foods to allow easy determination of the quantity of sodium chloride deposited on the surface. This process can also be used to color industrial salt used for such purposes as de-icing of roads and pathways. Coloring of such substances would allow determination of the amount of salt deposited in a specific area, as well as provide ready visibility to the areas where additional deposits of salt are necessary.

It is also envisioned that colored crystals can be used in a hobby craft industry, for example for making decorative items which utilize colored crystals of sand. In these cases sand can be replaced by colored salt crystals, used alone or in combination with chalk powder. The cost of colored salt is substantially less than the cost of colored sand, since coloring of the salt crystals can be achieved utilizing easily available household items and equipment.

It is also envisioned that the colors can be modified depending on seasonal holidays to add festivity to the food.

Many other uses of the method in accordance with the present invention will be apparent to those skilled in the art. While a number of examples were described herein, it is to be understood that many changes can be made in the present invention by persons skilled in the art without departing from the spirit thereof. I, therefore, pray that my rights to the present invention be limited only by the scope of the appended claims.

I claim:

1. A method of coloring a crystalline material, comprising the steps of:

placing a discrete quantity of the crystalline material into a container suitable for penetration by microwave energy;

adding a predetermined amount of a liquid coloring agent to the crystalline material to form a mixture;

agitating the crystalline material and coloring agent mixture to cause a substantially uniform distribution of the coloring agent;

positioning the container with the mixture into a path of microwave energy;

applying microwave energy to the mixture for a time sufficient to cause drying of the mixture; and removing the substantially dry mixture from the path of microwave energy.

2. The method as recited in claim 1, wherein the coloring agent is added in the concentration of between approximately 0.1 and 2% by total weight.

3. The method as recited in claim 1, wherein the mixture contains between 0.5 and 7.5 ml of the liquid coloring agent per 454 g of the crystalline material when the liquid coloring agent is added to the crystalline material.

4. The method as recited in claim 1, wherein the concentration of the coloring agent is between 0.5 and 7.5 ml per 454 g of the crystalline material.

5. The process as recited in claim 1, wherein the crystalline material is sodium chloride.

6. The method as recited in claim 1, wherein the coloring agent is a water based food coloring dye containing propylene glycol.

7. A method of manufacturing a colored crystalline material, which comprises:

mixing a crystalline material with a liquid coloring agent and exposing the resultant mixture to microwave energy for a period sufficient to cause drying of the mixture.

8. A process of coloring sodium chloride, which comprises the steps of:

mixing sodium chloride with a liquid coloring agent and exposing the resultant mixture to microwave energy for a time sufficient to dry the mixture.

9. The process as recited in claim 8, wherein the coloring agent is added in the concentration of between 0.1 and 2% by total weight.

10. The process as recited in claim 8, wherein the concentration of the coloring agent is between 0.5 and 7.5 ml per 454 g of sodium chloride.

11. A food product which comprises:

a crystalline substance and a coating of food coloring agent deposited on the; crystalline substance by exposing the crystalline substance mixed with the coloring agent in liquid form to microwave energy.

12. The food product of claim 11, in which the crystalline substance is sodium chloride, and the food coloring agent is a water-based food dye containing propylene glycol.

13. The food product of claim 12, wherein the food dye is added in the concentration of approximately between 0.5 and 7.5 ml per 454 g of sodium chloride.

14. The food product of claim 11, wherein the mixture is exposed to 700 watts of microwave energy for a period of approximately 5 to 60 seconds.

15. A method of coloring sodium chloride crystals, which comprises the step of:

applying microwave energy to a mixture comprising a water based food dye and sodium chloride crystals.

16. The method of claim 15, wherein the mixture comprises approximately between 0.5 and 7.5 ml of food dye per 454 g of sodium chloride.

17. The method of claim 15, wherein the mixture contains between 0.1 and 2% by total weight of food dye.

* * * * *